United States Patent Office 3,245,336
Patented Apr. 12, 1966

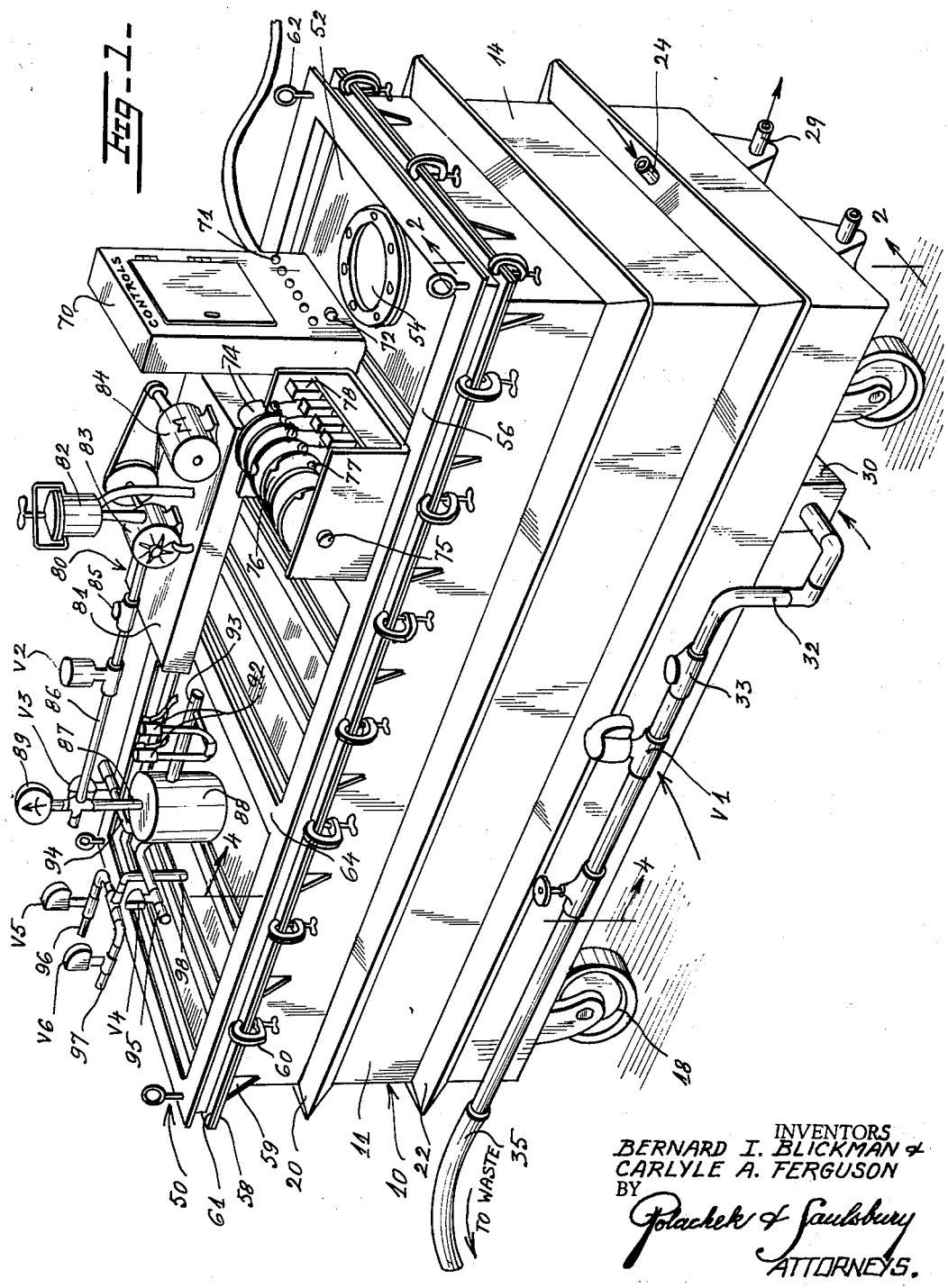

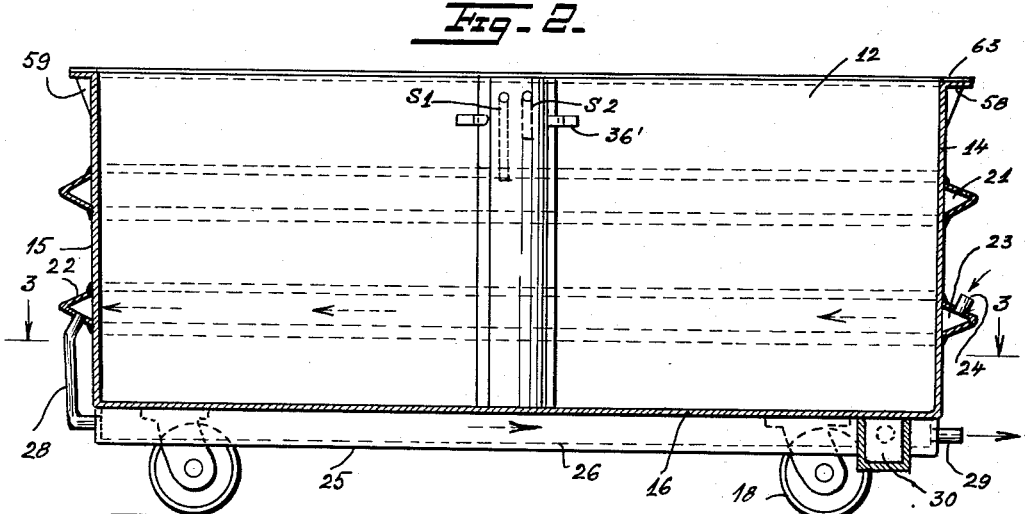
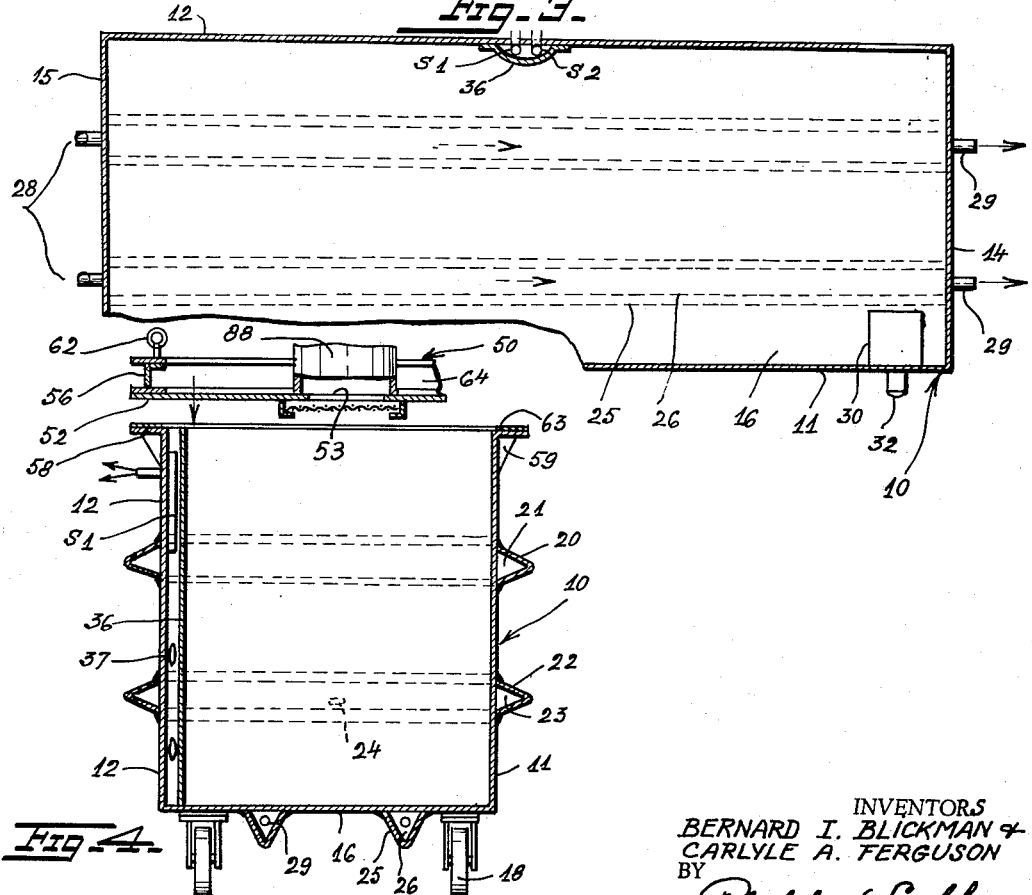

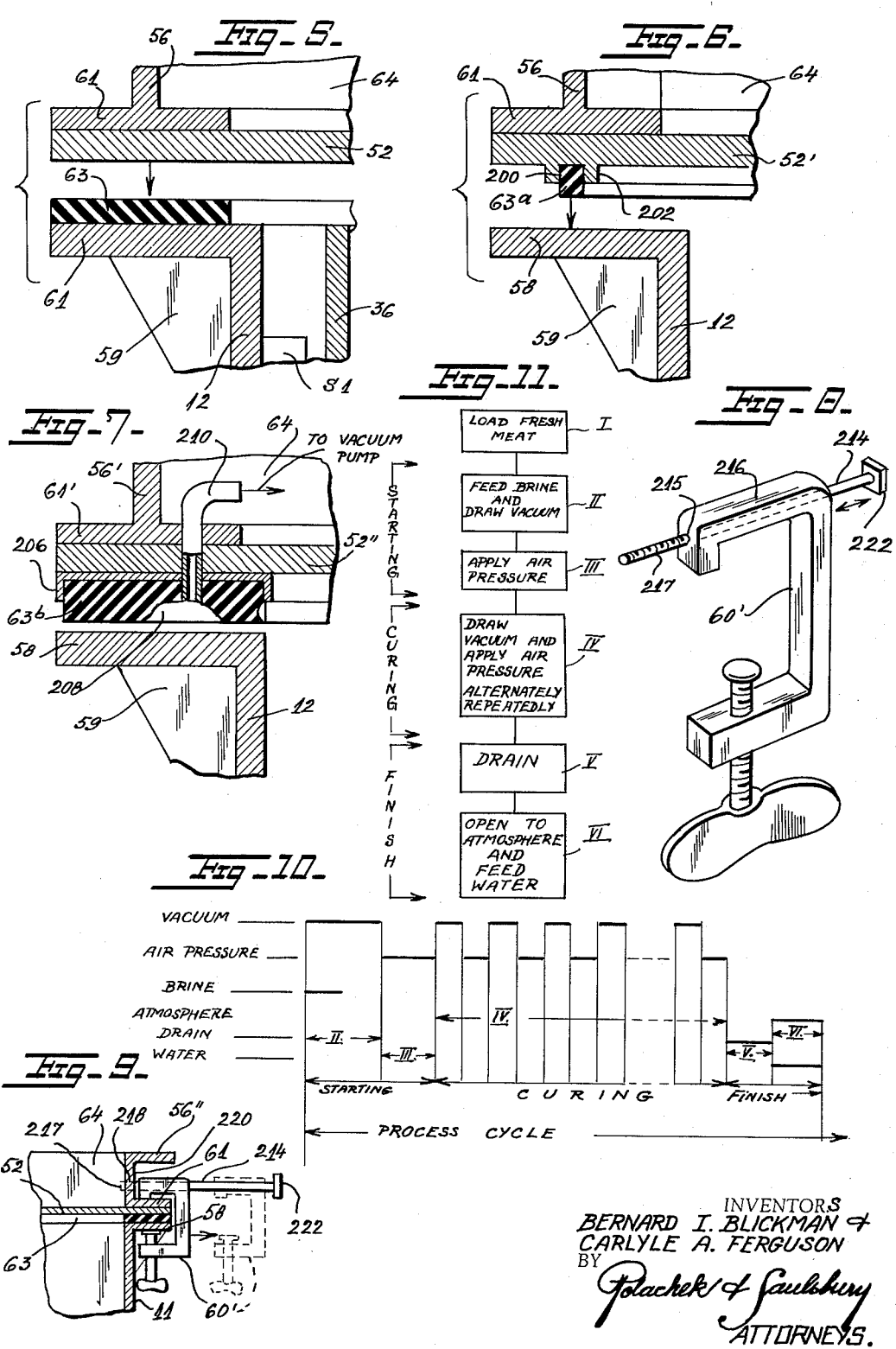

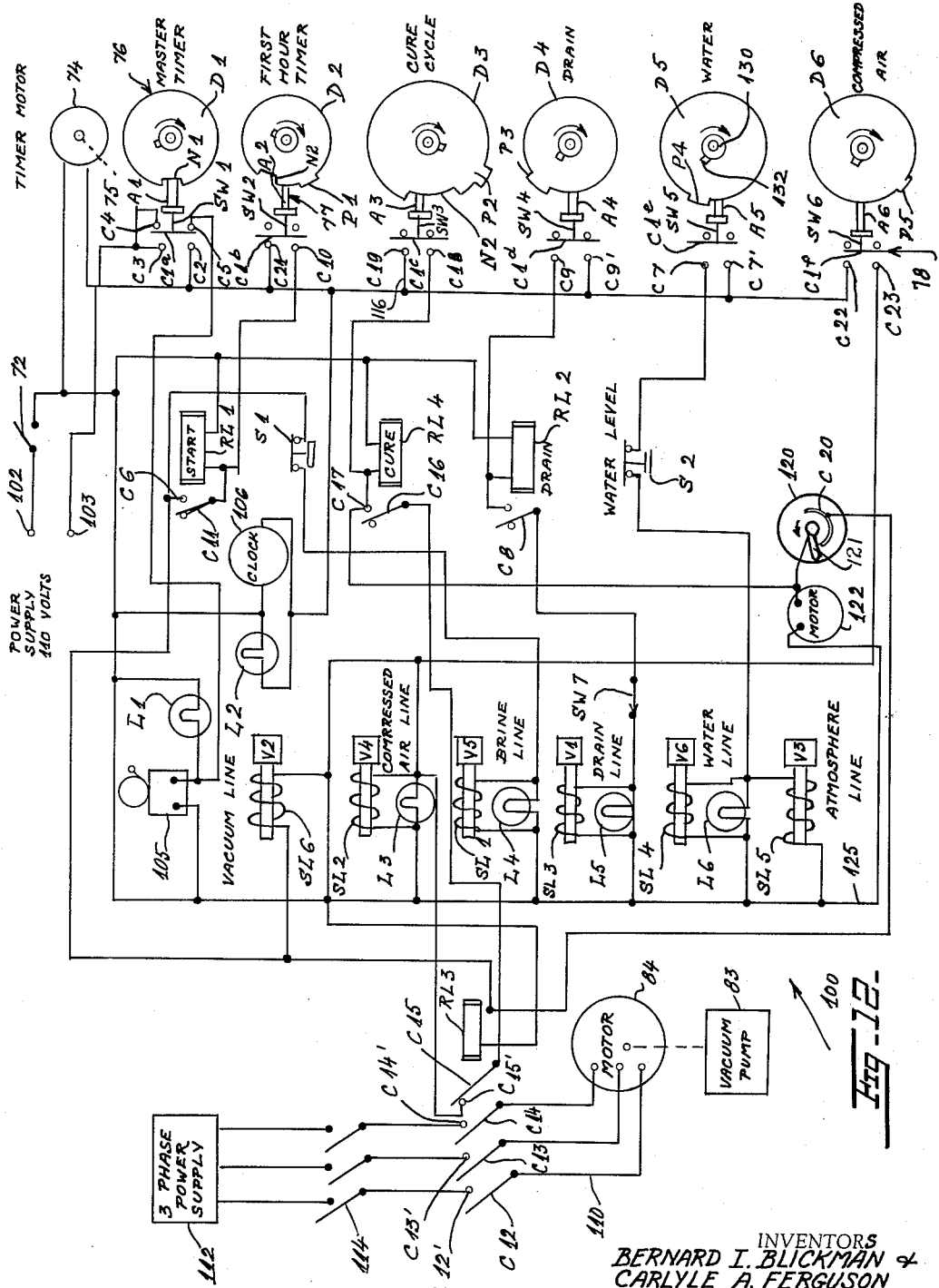

3,245,336
AUTOMATIC APPARATUS FOR CURING AND PICKLING MEATS
Bernard I. Blickman, New York, N.Y., and Carlyle A. Ferguson, Ramsey, N.J., assignors to S. Blickman, Inc., Weehawken, N.J.
Filed July 20, 1964, Ser. No. 383,808
8 Claims. (Cl. 99—254)

This invention relates to the art of pickling or curing meats and more particularly concerns an improved automatic apparatus for curing meats faster, more uniformly, and more economically than has heretofore been possible.

In order to pickle or cure meats by conventional methods, it generally requires several weeks of immersion of the meats in pickling brine. One common method generally employed is to inject pickling brine into the tissues of a piece of meat such as ham by means of a suitable syringe or hypodermic needle. Also it is not generally practical or possible to pump a large piece of firm meat such as knuckle or round beef.

Injection and arterial pumping are used to accelerate the pickling process. The limitations and disadvantages of both of these processes are well known.

The present invention has successfully overcome the above and other difficulties and disadvantages of prior methods of curing meats, and does so automatically, in a shorter time, more uniformly, and with less manual handling of the meats.

According to the invention there is provided a curing tank. On the tank is a removable head or cover fitted with mechanical components which automatically perform the several control operations required by the process. In the present process meat is loaded into the curing tank. The tank is covered, pickling liquor or brine is admitted to the tank and a vacuum is applied for initial treatment period of one hour. Then the vacuum is released and air pressure is applied for about three-quarters of an hour. The air pressure is about four pounds above atmospheric pressure. Then a curing period ranging from forty to one hundred and twenty hours begins in which the meat steeped in the brine is alternately subjected to vacuum and air pressure above atmospheric pressure, for twenty minute periods. During the curing period steam can be circulated in steam conducting tubes around the tank. At the end of the curing period the brine is drawn off and water is admitted to the tank. This water may be left in the tank or drawn off and the cover of the tank is then lifted off. The tank can then be moved away for further processing if desired, such as cooking the cured meat. If desired, a holding brine instead of water can be admitted into the tank before the cover is removed and the tank wheeled away.

It is therefore a principal object of the invention to provide an improved curing apparatus for meats to shorten the time of curing, to produce a more uniform product, to use less labor, and to effect the curing automatically.

Another object is to provide an apparatus as described wherein the meats to be cured are subjected to alternate periods of vacuum and air pressure above atmospheric pressure.

Other objects are to provide a curing tank with a removable head or cover carrying process control equipment; to provide means on a curing tank cover for controlling admission of pickling liquor, admission of water, admission of compressed air and drawing of a vacuum; and to provide a tank with steam circulating tubes.

Further objects are to provide improved sealing means between a tank and its cover to insure a hermetic seal of the tank during a meat curing process; and to provide means for retaining closure clamps in ready available positions for use when the tank cover is removed.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of an apparatus embodying the invention including assembled tank and cover.

FIG. 2 is a vertical sectional view taken on line 2—2 of FIG. 1, but with cover removed.

FIG. 3 is a horizontal sectional view taken on line 3—3 of FIG. 2, part being broken away.

FIG. 4 is a vertical sectional view taken on line 4—4 of FIG. 1, but with cover partially removed.

FIG. 5 is an enlarged fragmentary sectional view of part of FIG. 4.

FIG. 6 and FIG. 7 are sectional views similar to FIG. 5, illustrating alternate sealing means.

FIG. 8 is a perspective view of an improved sealing clamp which may be employed in the apparatus.

FIG. 9 is a reduced fragmentary sectional view of a tank and cover employing the clamp of FIG. 8.

FIG. 10 is a cycle diagram illustrating a process according to the invention.

FIG. 11 is a flow chart showing the process diagrammatically.

FIG. 12 is a diagram of the control system of the apparatus.

Referring first to FIGS. 1–4, there is shown a rectangular tank 10 with vertical side walls 11, 12, vertical end walls 14, 15 and a closed horizontal bottom 16. The tank is preferably made of stainless steel or other non-corrosive materials. The tank is provided with four casters 18 at the bottom to facilitate moving the tank around. Secured to the side and end walls of the tank are V-shaped channel members 20, 22 arranged to define endless ducts or tubes 21, 23 with the walls of the tank to which they are attached. Underneath the tank and attached to the bottom are two further channel member 25 defining straight ducts 26.

An inlet fitting 24 for feeding steam is secured to one end of channel member 22 at end wall 14. At opposite end wall 15 are pipes 28 connecting duct 23 with ducts 26 for conducting steam from duct 23. Outlet pipe fittings 29 are provided at the ends of ducts 26 below wall 14. A drain pocket or box 30 is fitted to the bottom of the tank. To this pocket is fitted a drain pipe 32. In this pipe is a one-way check valve 33 and a solenoid operated drain valve V1 which is electrically operated for permitting passage of waste brine via pipe 35 to a holding tank, sewer, etc. Duct 21 is a reserve duct to which further inlet and outlet pipes may be connected.

Inside the tank on side wall 12 is a partition 36 having lateral holes 37 into which liquid can enter. Inside the curved partition on wall 12 are mounted liquid level sensing devices S1 and S2. The lower device senses the level of brine filling the tank up to the height of the device S1 and the upper device S2 senses the level of water filling the tank up to the height of the device S2. These devices include electrodes or float operated switches connected in circuit with the control system of the apparatus which will be described. The partition is removably held by clamps 36′.

On the tank is a removable cover 50 which includes a flat metal base plate 52 having a viewing port 53 closed by a window 54 to provide a view into the interior of the tank. I-beams 56 are integrally joined together at their ends to define a rectangular framework are secured peripherally around base plate 52. Plate 52 is preferably made of stainless steel or other non-corrosive metal. The I-beams and edges of plate 52 overlay horizontal flanges 58 extending outwardly of the tank at upper edges of the side and end walls. Bracket or brace plates 59 join the flanges 58 and walls of the tank to reinforce and support the flanges. Removable C-clamps 60 have upper fixed jaws engaged on bottom flanges 61 of the I-beams and have lower movable jaws engaged underneath the flanges 58. A resilient rectangular sealing gasket 63 made of synthetic or natural rubber is interposed between flanges 58 and 61; see FIGS. 2, 4 and 5. At the four corners of the cover are eye bolts 62. The bolts are secured at outer joined ends of the I-beams. These eye bolts can be engaged by a suitable overhead crane or other mechanical means for lifting the cover vertically off of the tank.

On the base plate 52 and joining the longer lateral I-beams are further reinforcing cross beams 64. These are I-beams similar to beams 56 and define therewith a rigid framework upon which equipment constituting parts of the control system of the apparatus are mounted.

The control system includes a control box 70 mounted on a pair of cross beams 64 near one end of the cover. Between box 70 and the end of the cover is viewing port 53. On the box 70 are signal lamps 71 and a start button 72 by means of which operation of the automatically controlled equipment is initiated. Inside the control box are components of the system described below. Adjacent to the control box is a geared down motor 74 which drives a shaft 75 on which are rotatable timing disks 76. Operating arms 77 of switches 78 ride along suitable notched and cammed edges of the disks for actuating the switches in a predetermined timing cycle employed in the meat curing process.

Near the control box is mounted a vacuum pump assembly 80 including a base 81, oil filter 82, pump 83 and motor 84 driving the pump. The pump is connected via a one-way check valve 85 and pipe 86 to a pipe 87 opening into a dome 88. A gauge 89 reading air pressure inside the tank is mounted at the top of pipe 87. A solenoid controlled valve V2 is interposed in pipe 86 for electrically opening and closing the passage between the pump and the dome. Safety valves 92 are supported by branch pipe 93 connected to the dome. Another pipe 94 open to the atmosphere is connected to the dome via a solenoid controlled valve V3. Compressed air is fed to the tank through a pipe 95 connected to the dome via a solenoid controlled valve V4. A brine supply pipe 96 is connected in common with a water supply pipe 97 to a filler pipe 98 which opens through the cover into the tank. A solenoid controlled valve V5 controls passage of brine through pipe 96 and another solenoid controlled valve V6 controls passage of water through pipe 97. The equipment mounted on the cover is used in the control system 100 described in connection with FIG. 12 to which reference is now made. If desired, the apparatus for creating vacuum and pressure and control of cycle can be located remotely from the tank and upon separate mounting instead of being mounted upon the removable cover 50 as shown.

The system 100 includes timer motor 74 which drives shaft 75. On this shaft are adjustably mounted six timer disks 76. The first disk D1 is the master timer disk which can be adjusted on the shaft to determine the length of the curing process. The second disk D2 controls drawing of a vacuum in the tank during the first hour of operation. This timer disk controls operation of the solenoid valve V2 in the vacuum line and also controls operation of the solenoid valve V5 in the brine line. The third timer disk D3 controls the cyclic drawing of a vacuum and application of compressed air during the curing period. This disk controls solenoid valve V4 in the compressed air line and solenoid valve V2 in the vacuum line. Fourth timer disk D4 controls operation of solenoid valve V1 in the drain line. Fifth disk D5 controls solenoid valve V6 in the water supply line and solenoid valve V3 in the atmosphere line. Sixth disk D6 controls solenoid valve V4 for application of air pressure during the starting period of the curing process. Each of the timer disks operates in conjunction with an associated one of switches 78. These are single pole double throw switches whose arms 77 ride along the peripheries of the timer disks. When a notch, a recess or a camming projection is encountered the switches change position. In one position movable contact, C1a–C1f of each switch respectively is closed with one pair of fixed contacts and in the other position the movable contact closes with another pair of fixed contacts. The several switch arms are normally spring biased to the right as viewed in FIG. 12 to keep constant contact with the peripheries of the timing disks. Motor 74 has one terminal connected to terminal 102 of a suitable power supply via manual starting switch 72. The other terminal of the motor is connected to fixed contact C2 normally open with respect to contact C1a in switch SW1. Adjacent fixed contact C3 is connected to the other power supply terminal 103 and to fixed contact C4 normally closed with the contact C1a. Fixed contact C5 is connected to one terminal of a signal lamp L1 which is one of the lamps 71 on the control box 70 shown in FIG. 1. This lamp signals the end of the timed curing process. Contact C5 is also connected to one terminal of a buzzer or bell 105 which provides an audible alarm that the timed curing process is completed. Other terminals of the lamp L1 and buzzer are connected to power supply terminal 102. An elapsed time clock 106 to time the process, and a lamp L2 to indicate that curing is in process, are connected between contact C2 and power supply terminal 102.

Brine level switch S1 has normally closed contacts connected between solenoid SL1 of solenoid valve V5 and contact C6 of a starting relay RL1. Water level switch S2 has normally closed contacts connected to contact C7 normally open with respect to movable contact C1e in switch SW5 and to solenoid SL4. Signal lamps L3, L4, L5 and L6 are connected across solenoid coils SL2, SL1, SL3 and SL4, respectively, for indicating that these solenoids are energized and the valves controlled thereby are open. No lamp is provided for the solenoid SL5 of valve V3 and for solenoid SL6 of valve V2. The lamps are all located in the group of lamps 71 on box 70.

A drain control relay RL2 has a movable contact C8 connected to solenoid SL3 via manually operable switch SW7; and a fixed contact connected to the coil of the relay and to contact C9 in switch SW4. The relay coil is also connected to power supply terminal 102. The coil of relay RL1 is connected between power supply terminal 102 and both relay contact C11 and contact C10 of switch SW2. Fixed contact C6 of relay RL1 is connected to the coil of relay RL3 and solenoid SL6. All of the solenoids SL1–SL6 have one terminal connected to terminal 102.

Motor 84 which drives pump 83 is connected via three lines 110 to a 3-phase power supply 112. Interposed in the lines are manually operable ganged switches 114 and three movable relay contacts C12, C13 and C14 normally open with respect to fixed contacts C12', C13' and C14' in relay RL3. This relay has a further pair of normally closed contacts C15, C15'. Movable relay contact C15 is connected to contact C16 of relay RL3. Fixed contact C15' is connected to one end of the solenoid coil SL2 operating the compressed air valve V4. Contact C17 of cure relay RL4 is connected to one terminal of the relay coil and to contact C18 of switch SW3. The other terminal of the relay coil is connected to power supply terminal 102. Contact C19 of switch SW3 is connected to contact C2 of switch SW1 via wire 116.

A timer switch 120 is provided for timing alternate drawing of a vacuum and applying pressure in the tank. This switch has contact arm 121 rotated continuously by a motor 122 when the motor is energized. The motor and arm 121 are connected together to contact C17 of relay RL4. The motor is also connected to power supply terminal 102 via line 125. The switch 120 has an arcuate semicircular contact C20 with which contact arm 121 closes during one half of each rotation of the arm. The motor is arranged to rotate the arm 121 once every forty minutes so that arm 121 closes with contact C20 for twenty minutes and is open from contact for twenty minutes during each cycle of rotation of the switch arm.

In operation of the control system 100, the timer disk D1 will be set with respect to the arm A1 so that the time required for notch N1 in the disk to reach arm A1 will be any length of time up to approximately 120 hours. When the disk is so rotated, arm A1 will be retracted from notch N1 and contact C5 will close with contacts C2, C3 while contacts C4, C5 will be open.

Notch N2 in disk D2 will be located close to arm A2 so that the arm rides on projection P1 during the first hour of the process. Disk D3 has an extended camming projection P2 upon which arm A3 will ride after arm A2 rides off of projection P1. Disk D3 will be adjusted along with disk D1 so that the notch N2 of the disk reaches arm A3 at the end of the curing period durng which drawing of a vacuum alternates with application of pressure. Disk D4 has a projection P3 which should be located so that arm A4 rides on this arm when the tank is to be drained at the end of the curing period.

Disk D5 has a projection P4 on which arm A5 of switch SW5 rides when water is to be fed into the tank after the curing period. Disk D6 has a projection P5 on which arm A6 of switch SW6 rides during a forty minute period following the end of the first hour of the process, just after arm A2 leaves projection P1 of disk D2. The disks can be relatively positioned and secured on shaft 75 by any suitable means such as a collar 130 on each disk provided with a setscrew 132 which engages shaft 75. The mechanism is arranged so that shaft 75 and the timing disks rotate not more than once for each complete timing cycle, in this instance, no more than once in about 120 hours.

To carry out the process using the control system 100 the tank is first loaded in step I as indicated in the flow chart of FIG. 11. The cover 50 is placed on the tank and hermetically sealed by application of C-clamps 60. Then the start switch is manually closed. Power line switch 114 should be closed. Since switch arm A1 is retracted from notch N1 by the presetting of disk D1, the power supply circuit of motor 74 is completed through closed contacts C1a, C3 and the timer motor starts. This begins step II of the process, the starting period of the curing cycle. Projection P1 of disk D2 encounters switch arm A2 and switch contacts C1b, C10 and C21 close and remain closed for about one hour. The start relay RL1 becomes energized and contacts C6, C11 close. This completes the power supply circuit for solenoid SL1 and the brine line opens to pass pickling liquor from a suitable supply thereof into the tank. When the level of the pickling liquor reaches a predetermined level, the level sensing switch S1 opens to open the power supply circuit of solenoid SL1 and valve V5 opens. While the tank is filling with the pickling liquor, both soleoid SL6 and relay RL3 become energized through closed contacts C6, C11 of the start relay RL1. The contacts C15, C15' open while relay contacts C12, C13, C14 close with contacts C12', C13', C14' respectively. This starts motor 84 and pump 83 starts pumping air out of the tank while brine runs into the tank. Pumping continuous for the entire first hour of step II so that as complete a vacuum as possible is obtained in the tank during this hour. The meat in the tank is subjected to this vacuum for substantially the entire first hour. Then step III begins with opening of switch contacts C1b, C10, C21 and closing of contacts C1f, C22 and C23 of switch SW6. The motor 84 is stopped, vacuum pumping stops and valve V2 closes. Valve V4 opens as coil SL2 becomes energized and compressed air enters the tank. Air pressure is raised to about four pounds above atmospheric pressure or about eighteen pounds per square inch, absolute. This continues for about three-quarters of an hour. This completes the starting period.

The starting period is illustrated in the cycle diagram of FIG. 10 as including the drawing of vacuum and simultaneous supply of brine of step II, then application of compressed air while brine supply and vacuum pumping are cut off in step III.

Step IV then starts with opening of switch contacts C1f, C22, C23, and closing of contacts C1c, C18, C19 of the cure cycle switch SW3. The cure relay RL4 becomes energized and contacts C16, C17 close. At the same time timer motor 122 starts. Switch contact arm 121 closes with contact 120 and remains closed for about twenty minutes. During this time solenoid SL6 and relay RL3 are energized. The vacuum pump is again driven by the motor 84 and substantially complete vacuum is maintained in the tank for close to twenty minutes. It will be noted that during this time contacts C15, C15' are open so that the power supply line of solenoid SL12 is deenergized and valve V4 is closed. When switch C20 opens contacts C15, C15' close as relay RL3 becomes deenergized and valve V2 closes. The compressed air line then opens as valve V4 opens and about four pounds of air pressure above atmospheric pressure is applied for about twenty minutes. Then switch C20 closes again to repeat the drawing of a vacuum. This cyclic drawing of a vacuum and application of high air pressure is repeated during the entire curing period which may be any length of time up to one hundred and twenty hours. As examples, for brisket curing to make corned beef this may be about sixty hours, while heavy round beef to make dried, chipped beef may require about one hundred and twenty hours.

At the end of the curing period, switch contacts C1c, C18, C19 open and contacts C1d, C9, C9' of drain switch SW4 opens for step V of the process. The spent pickling liquor is drained off as solenoid SL3 is energized and valve V1 opens. After a suitable draining period of less than one-half an hour, the solenoid S13 is deenergized, valve V1 opens, and contacts C1d, C9, C9' open. Then in step VI cold or hot water is fed into the tank, or a holding brine in lieu of water may be fed in via valve V6 which opens as contacts C1e, C7, C7' close. At the same time the tank is open to atmosphere via valve V3 which opens as solenoid SL5 becomes energized. Water feed stops when level sensing switch S2 opens to close valve V6. The timing disk now reaches the end of the process timing. Switch arm A1 enters notch N1 and switch contacts C1a, C4, C5 close as contacts C1e, C7, C7' open. This closes the power supply of lamp L1 and sounds buzzer or bell 105 to signal the end of curing. Motor 74 stops. Clock 106 continues to run and indicates the elapsed time of the process. The cover of the tank can then be removed and the tank can be wheeled away. Another tank can then be placed in position under the cover 50 or the same tank 10 can be emptied and used again to repeat the process with another load of meat.

The tank 10 should be large enough to hold the required amount of pounds of meat at a time for curing. Briskets, round beef, knuckles or any other type and cut of meat to be cured may processed. Injection of brine into meats by syringes, needles or "pumping" is avoided. The brine or pickling liquor may contain any suitable mixture depending on the results desired. A water solution of sodium chloride, sodium nitrate and sodium nitrite will in general be satisfactory for most meats.

During the curing period, step IV, it is possible to circulate steam or cooling fluids through the ducts 23 and 26 to keep the meat at desired temperature to effect proper curing.

FIG. 6 shows a sealing arrangement which may replace that of FIG. 5. Instead of flat gasket 63 there is provided a thick, narrow gasket 63a which is retained in a groove 200 defined between a pair of spaced flanges 202 at the underside of the base plate 52' of the cover. The gasket projects below the free ends of the flanges and bears down on the top of flange 58 when the cover is lowered. The C-clamps 60 of FIG. 1 effect a hermetic seal when the clamps are tightened.

FIG. 7 shows another sealing arrangement in which gasket 63b is wide and thick and retained in a channel 206 extending all around the underside of plate 52″ at its periphery. In the bottom of the gasket is a continuous passage 208 extending all around the gasket under the plate 52″. Communicating with passage 208 is a pipe 210 which passes through registering holes in the gasket, channel 206, base plate 52″ and bottom flange 61′ of the I-beam 56′. The pipe 210 can be connected to the vacuum pump 83 in FIG. 1 to maintain suction in the passage 208 and thus retain an effective hermetic seal during vacuum drawing periods of the curing cycle. An external source of vacuum may be used to effect seal.

FIGS. 8 and 9 show a modified arrangement of C-clamp 60′ which can be used in the appartus. This C-clamp has a long rod or bolt 214 axially slidable in a bore 215 formed in the upper arm 216 of the C-clamp. The free end 217 of the bolt is threaded. This threaded end can be screwed into a hole 218 in the vertical wall 220 of I-beam 56″. A head 222 on the other end of the bolt will prevent the C-clamp from falling off of the bolt; and when the clamp is removed from engagement with the I-beam, the clamp can be retracted to the dotted line position of FIG. 9. The bolt 214 will remain attached to the I-beam while the cover is lifted off of the tank, and will hold the C-clamp. Thus the C-clamp cannot become displaced or misplaced and will be ready and available for reengagement with the I-beam when the cover is lowered on the tank again for performing another curing cycle. All the clamps 60 of FIG. 1 can be arranged like clamps 60′.

It will be apparent from the foregoing description that the entire curing of the meat is performed with the tank hermetically sealed and proceeding entirely automatically with no manual handling required other than loading the tank and unloading the tank. The curing of meat is always uniform because the same process can be repeatedly performed. The curing takes place at most in a few days as contrasted with conventional methods which take weeks and require much manual handling of the product, with non-uniform results While we have illustrated and described the preferred embodiments of our invention, it is to be understood that we do not limit ourselves to the precise constructions herein disclosed and that various changes and modifications may be made within the scope of the invention as defined in the appended claims.

Having thus described our invention, what we claim as new, and desire to secure by United States Letters Patent is:

1. Apparatus for curing meat automatically, comprising an open top tank adapted to hold a quantity of meat ranging up to at least two thousand pounds, a removable cover for said tank, means for hermetically sealing said cover peripherally to the top of the tank, control means mounted on the cover, means for feeding pickling liquor through said cover into the tank to a predetermined level under control of said control means, pump means for drawing air through said cover to establish substantially a complete vacuum in the interior of the tank under control of said control means, compressed air supply means for applying air in excess of atmospheric pressure through said cover under control of said control means, means in said control means for disabling said pump means while said compressed air supply means is activated and for cutting off the air supply means while said pump means is activated, and timing means for cyclically controlling drawing of said complete vacuum and application of said air pressure in alternation for a sufficient length of time to complete cure of the meat in said pickling liquor.

2. Apparatus for curing meat automatically, comprising an open top tank adapted to hold a quantity of meat ranging up to at least two thousand pounds, a removable cover for said tank, means for hermetically sealing said cover peripherally to the top of the tank, control means mounted on the cover, means for feeding pickling liquor through said cover into the tank to a predetermined level under control of said control means, pump means for drawing air through said cover to establish substantially a complete vacuum in the interior of the tank under control of said control means, compressed air supply means for applying air in excess of atmospheric pressure through said cover under control of said control means, means in said control means for disabling said pump means while said compressed air supply means is activated and for cutting off the air supply means while said pump means is activated, and timing means for cyclically controlling drawing of said complete vacuum and application of said air pressure in alternation for a sufficient length of time to complete cure of the meat in said pickling liquor, means under control of said control means for draining off spent pickling liquor from the tank, and means under control of said control means for feeding a liquid through the cover to the tank while opening the tank through the cover to atmospheric air.

3. Apparatus according to claim 1, wherein said sealing means includes abutting peripheral flanges on said tank and cover, a resilient sealing gasket between the abutted flanges, and clamping means for pressing the abutted flanges together with said sealing gasket therebetween.

4. Apparatus according to claim 1, wherein said sealing means includes facing peripheral flanges on said tank and cover, a resilient sealing gasket between the abutted flanges, and C-clamps pressing abutted flanges together with said sealing gasket therebetween.

5. Apparatus according to claim 1, wherein said sealing means includes abutting peripheral flanges on said tank and cover, a resilient sealing gasket between the abutted flanges, a passage extending longitudinally of said gasket having a groove in one side facing one of the flanges, and means for drawing a vacuum in said groove so that the flanges are pressed together by air pressure with said gasket therebetween.

6. Apparatus according to claim 1, wherein said sealing means includes facing peripheral flanges on said tank and cover, a resilient sealing gasket between the abutted flanges, C-clamps pressing abutted flanges together with said sealing gasket therebetween, and means slidably connecting the C-clamps to the cover so that C-clamps are retained thereon when the cover is removed from the tank.

7. In apparatus of the character described, a control system for automatically controlling a meat curing process, comprising timing means settable to a predetermined process time, a plurality of solenoid controlled valves, circuit means interconnecting the timing means and said solenoid controlled valves for cyclically turning the valves on and off in a predetermined sequence, vacuum drawing means controlled by a first one of said valves, a compressed air supply controlled by a second one of the valves, a pickling liquor supply controlled by a third one of the valves, a water supply controlled by a fourth one of the valves, drain means controlled by a fifth one of the valves, and atmosphere admission means controlled by a sixth one of the valves.

8. In apparatus of the character described, a control system for automatically controlling a meat curing process, comprising timing means settable to a predetermined process time, a plurality of solenoid controlled valves, circuit means interconnecting the timing means and said solenoid controlled valves for cyclically turning the valves on and off in a predetermined sequence, vacuum drawing means controlled by a first one of said valves, a compressed air supply controlled by a second one of the valves, a pickling liquor supply controlled by a third one of the valves, a water supply controlled by a fourth one of the valves, drain means controlled by a fifth one of the valves, and atmosphere admission means controlled by a sixth one of the valves, and cyclically operated switch means operatively connected to the first solenoid valve and the second solenoid valve so that when the first valve is closed, the second valve is opened and vice versa, during a predetermined part of said process time.

References Cited by the Examiner

UNITED STATES PATENTS

| | | | |
|---|---|---|---|
| 7,766 | 11/1850 | Starkweather | 99—159 |
| 328,016 | 10/1885 | Dickinson | 99—255 |
| 550,151 | 11/1895 | Auerkamp | 99—255 |
| 2,013,156 | 9/1935 | Jones et al. | 99—255 X |
| 2,471,282 | 5/1949 | Paddock | 99—107 |
| 2,629,311 | 2/1953 | Graves | 99—255 |
| 2,742,367 | 4/1956 | Bachert | 99—255 X |
| 2,766,679 | 10/1956 | Unger | 99—257 |

FOREIGN PATENTS

| | | |
|---|---|---|
| 298,802 | 10/1928 | Great Britain. |
| 494,388 | 10/1938 | Great Britain. |

WALTER A. SCHEEL, *Primary Examiner.*

HYMAN LORD, *Examiner.*